Dec. 19, 1950  R. G. THOMAS  2,534,483
VAPOR INJECTOR
Filed Aug. 11, 1948
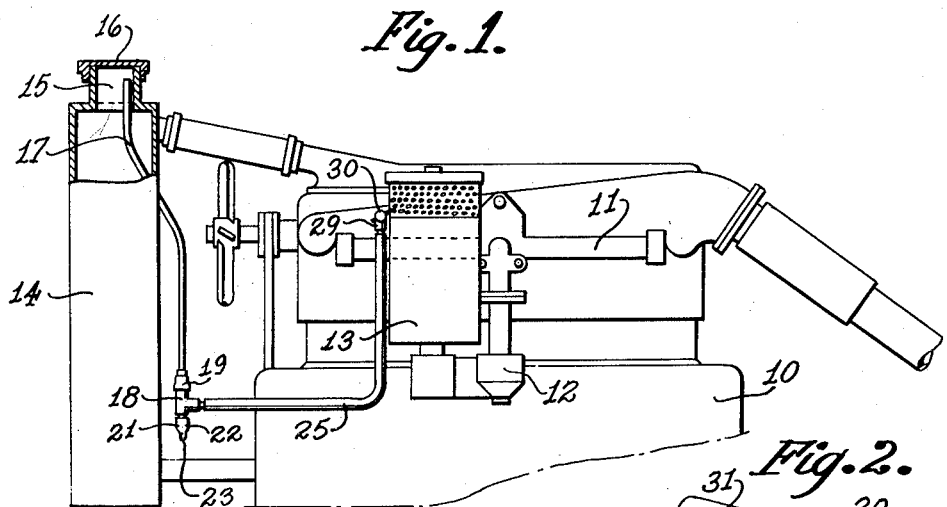
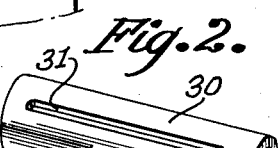
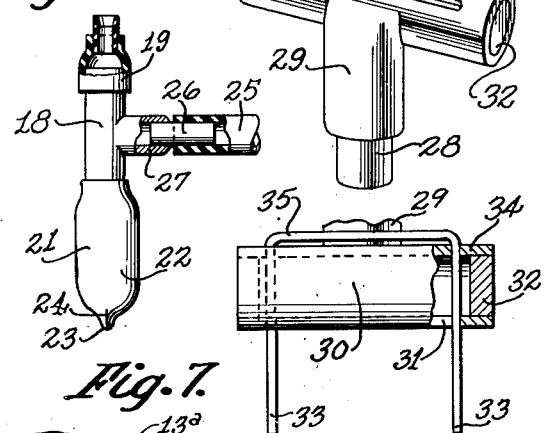
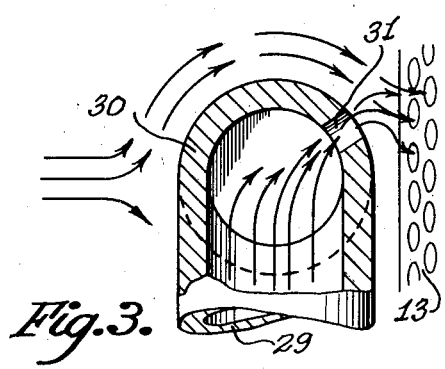
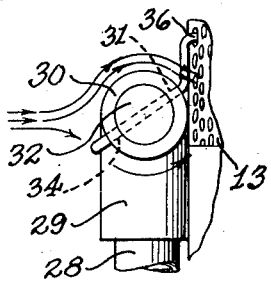
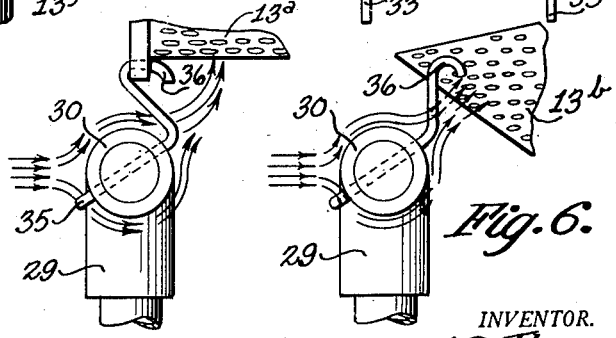
INVENTOR.
Raymond G. Thomas
BY
Wilkinson & Mawhinney
Attorneys Patented Dec. 19, 1950

2,534,483

UNITED STATES PATENT OFFICE 2,534,483

VAPOR INJECTOR

Raymond G. Thomas, Washington, D. C.

Application August 11, 1948, Serial No. 43,607

9 Claims. (Cl. 123—25)

1

The present invention relates to improvements in vapor injectors and consists in certain improvements in the devices illustrated and described in my prior Patent No. 1,724,785 granted August 13, 1929, and in my similarly-entitled copending application filed January 14, 1947, Serial No. 721,941, of which the present application is a continuation-in-part.

In common with the objects of my prior patent and application aforesaid, the present invention aims to provide a device which breathes moisture into the carbureter intake air stream without the need for any additional operating gear, valves or water tank to install and fill.

The improved injector employs an airfoil, Bernoulli lift, in the carbureter air intake stream to create a slight vacuum which lifts water vapor from the radiator, pulls it through a tube, and mixes this vapor with the air stream being drawn into the engine fuel induction system whereby moist air burns with the gasoline or other fuel mixture and results in the saving of gasoline, the giving of better engine performance, reducing of engine wear and tear, the giving of better lubrication and the increasing of engine operating efficiency.

Carbureted air thus moistened makes the engine run cooler, flattens the explosion curve, absorbs heat, saves oil, improves lubrication, and gives high-test performance with cheaper gasoline.

The improved injector is simple to install, natural in operation and effective in performance; it does not disturb the nice adjustment built into the gas control for easy starting; it automatically leans the mixture as the working engine's temperature rises; and it automatically increases the moisture content, humidity, of the induction air as the cold engine warms to its normal operating temperature.

While the improved injector uses water from the radiator to improve engine performance, it consumes little water and does not require extra attention of the radiator.

The improved injector functions automatically as the engine warms up and does not interfere with the rich mixture necessary for starting.

Vapor from the radiator makes the combustion mixture more lean, the lean mixture giving more horsepower at greater efficiency, while humidity favors an increase in spark advance for optimum performance, which reduces knocking with lean mixtures.

The invention aims to cool the engine by using the waste vapor as an inert gas which flattens out the explosion curve for increasing efficiency, cooler running and less wear on the valves, valve seats and on the cylinder walls.

The result of the improved vapor injector is to tend to reduce fuel and oil consumption, engine wear, carbonization, and to produce greater efficiency; all of which is particularly true in hot, dry climates or where the engine is under a heavy work load.

The invention applies not only to gasoline but to all types of internal combustion engines.

An important feature of the present invention is that it places the radiator under a partial vacuum, the degree of which is controlled by the port area of the slot in the airfoil head, which slot may be changed as to form, size and position to meet changes in types of automobile and commercial installations.

With the foregoing and other objects in view, the invention will be more fully described hereinafter and more particularly pointed out in the appended claims.

In the drawings, in which like parts are denoted by the same reference characters throughout the several views, Figure 1 is a side elevational view of an internal combustion engine and accessories, with parts broken away and parts shown in section, illustrating an improved vapor injector according to the present invention;

Figure 2 is a perspective view of a form of airfoil head employed;

Figure 3 is a cross-sectional view taken through the airfoil head on an enlarged scale;

Figures 4, 5 and 6 are end elevational views of the head in relation to various types of air strainers;

Figure 7 is a top plan view of the head, partly sectionalized, showing one form of attaching device; and Figure 8 is a side elevational view of a form of overflow valve employed.

Referring more particularly to the drawings, 10 designates generally an internal combustion engine such as employed to drive automobiles, 11 is the intake manifold thereof and 12 the conventional carbureter. An air strainer or air cleaner 13 is provided in connection with the air intake of the carbureter 12 to purify the induction air drawn into the carbureter 12 and induction system 11 of the engine.

A radiator of approved construction is represented at 14, the same having the usual filling neck 15 enclosed by the removable cap 16, and 17 represents the customary overflow pipe having its upper end in open communication with a high point in the vapor space or head of the radiator 14 and with its lower end brought down to a low point for discharging excess or overflow water from the radiator 14.

In accordance with the present invention, a sleeve 18 of hard rubber, plastic, compressible material or other desired substance is affixed as an accessory to the lower end of the overflow pipe 17, as by means of an expansible nipple 19 connected to the sleeve 18 by a rubber or other resilient tubular reduction coupling 20. The lower end of the sleeve 18 carries a form of liquid exhaust valve comprising the opposed pair of resilient walls 21, 22 having the closed bottom edges 23 and the side slits 24 which are biased to a closed position by the inherent resiliency of the walls 21, 22 which may be of rubber or other suitable material. Such side slits 24 may also be normally maintained in a closed position by external atmospheric pressure upon the walls 21, 22. due to the partial vacuum within the valve developed by engine suction.

A vapor tube or conduit 25 connects with the sleeve 18 and extends to a point at or near the air strainer 13. This tube or conduit is preferably of rubber or some flexible material in order that it may be adapted to the particular make and model of vehicle.

As shown in Figure 8 the lower end of the rubber tube 25 is fitted over a nipple 26 projecting from a horizontal branch 27 of the sleeve 18.

The upper end of the tube 25 is fitted over a reduced end 28 of the upright tubular member 29 of the hollow airfoil head 30, which is provided with the slot 31 and the end plugs 32. The airfoil head 30 may conveniently be suspended from the air strainer 13 by providing one or more hooks for engaging the foraminous or recticulated wall of the air strainer. One form of such arrangement is illustrated in Figure 7 in which a wire is bent upon itself to provide substantially parallel legs 33 insertible through perforations 34 in the forward wall of the hollow airfoil head 30 and through the vapor discharge slot 31. The closed bar 35 of the wire engages the forward wall of the head 30 and prevents the wire being pulled through the perforations 34 and slot 31. The free terminals of the wire legs 33 are fashioned into hooks 36 adapted to be entered into perforations of the air strainer 13 and clinched thereinto.

The airfoil head 30 may be of hard rubber, plastic or other appropriate material, and the suspension hooks 36 are so related to the head 30 as to maintain same with the slot facing the air strainer 13 and at an angle to the vertical preferably of the order of 56°. The head 30 being rounded presents an airfoil section to the streamline from the engine fan and that created by the forward motion of the automobile and the engine suction, causing such streamline to move in the directions indicated by the arrows.

In the use of the device, the improved vapor injector may be applied to existing forms of internal combustion engines and sold separately as an accessory. To apply, place the valve body or sleeve 18 over the lower end of the radiator overflow pipe 17, and hook the airfoil vapor injector 30 onto the engine induction strainer 13, 13ª or 13ᵇ, as shown in Figures 4, 5 or 6, depending on the type of strainer. Pinch hooks 36 with pliers to securely fasten the airfoil head in place. The rubber tubing 25 is attached to the valve body 18 and to the head 30 in any suitable manner and clamped to the block or frame at appropriate points.

To obtain the best results have the engine spark advanced to give the engine a slight ping when pulling a heavy load, or when starting with a cold engine. The vapor from the warm engine will automatically give a leaner mixture and a greater optimum spark advance; hence the device saves gasoline, cools the engine and promotes general engine efficiency, which reduces wear and tear on the moving parts of the engine.

The position of the slot 31 on the airfoil section is such that the passage of the air as indicated by the arrows creates a vacuum pull through the hollow head 30, tubing 25 and overflow pipe 17 on the vapor space in the radiator 14, whereby such radiator space is constantly under partial vacuum. The result is that a supply of vapor is constantly present in the airfoil head 30 ready to be drawn into the fuel induction system of the engine.

While I have disclosed herein the best form of the invention known to me at the present time, I desire it to be understood that I reserve the right to make changes and modifications in the herein described embodiment of the invention provided such changes fall within the scope of the following claims.

What I claim is:

1. For use with a power plant including an internal combustion engine having a fuel induction system including an air strainer and a cooling radiator having an overflow pipe, a water vapor injector comprising a fitting adapted to be attached to the lower end of the overflow pipe and having a normally closed opening for excluding atmospheric air but openable under pressure or weight of water in the overflow pipe to discharge such water, a vapor tube connected to said fitting, an airfoil head/Bernoulli lift connected to said tube having an opening therein communicating with said tube and exposed on the airfoil section of the head, and attaching means carrying said head and adapted to engage the air strainer to maintain the opening toward the air strainer in such relation that the airstream moving over the airfoil section will place the vapor space of the radiator under partial vacuum.

2. A water vapor injector as claimed in claim 1 characterized by the fact that the attaching means is adapted to maintain the opening in the airfoil head at an angle to the vertical of the order of 56°.

3. A water vapor injector as claimed in claim 1 characterized by the fact that said attaching means includes a hook for fitting into the foraminous wall of the air cleaner.

4. A water vapor injector as claimed in claim 1 characterized by the fact that the head is hollow and has end plugs.

5. A water vapor injector as claimed in claim 1 characterized by the fact that the opening in the head is a slot and the head is hollow to maintain a supply of water vapor to engine induction adjacent to the air cleaner and to augment Bernoulli lift throughout the entire slotted length of said head.

6. A water vapor injector as claimed in claim 1 characterized by the fact that the attaching means comprises a wire bent to provide an intermediate stop bar and substantially parallel legs insertible through perforations and the opening of the head with hooks formed on the terminal ends of the legs.

7. A water vapor injector for internal combustion engines having an induction system including an air intake and a cooling system including a radiator and overflow pipe, comprising a hollow head having an external airfoil contour and a slot, a connection adapted to place the internal space of the hollow head in communication with the overflow pipe, and means to support the head with the slot toward the air intake on an angle displaced from the vertical.

8. A water vapor injector as claimed in claim 7 in which the angle is of the order of 56°.

9. A water vapor injector as claimed in claim 7 in which an air cleaner having a foraminous wall is connected to the intake and the airfoil head is carried by a hook engaged with said foraminous wall.

RAYMOND G. THOMAS.

REFERENCES CITED

The following references are of record in the file of this patent:

UNITED STATES PATENTS

| Number | Name | Date |
|---|---|---|
| 1,384,702 | Maloney | July 12, 1921 |
| 1,624,838 | Lipinski | Apr. 12, 1927 |
| 1,640,571 | Humphrey | Aug. 30, 1927 |
| 1,724,785 | Thomas | Aug. 13, 1929 |
| 2,108,556 | Hardt | Feb. 15, 1938 |
| 2,122,414 | Foster | July 5, 1938 |